United States Patent
Chang et al.

(10) Patent No.: US 12,179,561 B2
(45) Date of Patent: Dec. 31, 2024

(54) CONTROL OF DUAL COMPRESSOR CLIMATE SYSTEM

(71) Applicant: Ford Global Technologies, LLC, Dearborn, MI (US)

(72) Inventors: Jennifer Helen Chang, Livonia, MI (US); Rohan Shrivastava, Livonia, MI (US); Brett Allen Dunn, Plymouth, MI (US); Jordan Mazaira, Taylor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 338 days.

(21) Appl. No.: 17/879,333

(22) Filed: Aug. 2, 2022

(65) Prior Publication Data

US 2024/0042831 A1 Feb. 8, 2024

(51) Int. Cl.
*B60H 1/32* (2006.01)
*B60H 1/00* (2006.01)

(52) U.S. Cl.
CPC ....... *B60H 1/3205* (2013.01); *B60H 1/00278* (2013.01); *B60H 1/323* (2013.01); *B60H 2001/3238* (2013.01); *B60H 2001/3272* (2013.01)

(58) Field of Classification Search
CPC .. B60H 1/00278; B60H 1/3205; B60H 1/323; B60H 2001/00307; B60H 2001/3238; B60H 2001/3272
See application file for complete search history.

(56) References Cited

U.S. PATENT DOCUMENTS

| | | | |
|---|---|---|---|
| 10,831,859 B2 | 11/2020 | Van Wiemeersch et al. | |
| 2016/0364812 A1 | 12/2016 | Cao | |
| 2021/0123450 A1 | 4/2021 | Han et al. | |
| 2021/0283978 A1* | 9/2021 | Bray | B60H 1/3205 |
| 2021/0283979 A1* | 9/2021 | Bray | B60H 1/32281 |
| 2021/0291629 A1 | 9/2021 | Chang et al. | |
| 2022/0097487 A1* | 3/2022 | Jin | B60K 11/04 |

FOREIGN PATENT DOCUMENTS

| | | |
|---|---|---|
| CN | 111251829 A | 6/2020 |
| CN | 113511043 A | 10/2021 |

* cited by examiner

*Primary Examiner* — Henry T Crenshaw
(74) *Attorney, Agent, or Firm* — David B. Kelley; Brooks Kushman P.C.

(57) ABSTRACT

While a speed of a first compressor during operation is less than a threshold speed, a speed of a second compressor during operation is prevented from falling below a minimum threshold speed that is defined by a sum of the speed of the first compressor and a predefined offset speed delta such that the minimum threshold speed changes as the speed of the first compressor changes.

19 Claims, 2 Drawing Sheets

CONTROL OF DUAL COMPRESSOR CLIMATE SYSTEM

TECHNICAL FIELD

This disclosure relates to automotive climate systems and the control thereof.

BACKGROUND

An automotive vehicle may include components and areas that require temperature control. A cabin, for example, may need cooling during hot ambient conditions and heating during cold ambient conditions. Components that convert or store electrical energy may need cooling during operation and heating during other conditions. A battery, for example, may need cooling during charge/discharge operations and heating during cold ambient conditions.

SUMMARY

An automotive climate system includes first and second compressors and a controller. The controller, while a speed of the first compressor during operation is less than a threshold speed, prevents a speed of the second compressor during operation from falling below a minimum threshold speed that is defined by a sum of the speed of the first compressor and a predefined offset speed delta such that the minimum threshold speed changes as the speed of the first compressor changes. The compressor also, while the speed of the first compressor during operation is greater than the threshold speed, prevents a speed of the second compressor during operation from exceeding a maximum threshold speed that is defined by a difference between the speed of the first compressor and the predefined offset speed delta such that the maximum threshold speed changes as the speed of the first compressor changes.

A method includes operating first and second compressors of a climate system such that a speed of the second compressor is at least equal to a sum of a speed of the first compressor and a predetermined offset speed delta responsive to the speed of the first compressor being less than a threshold speed.

A vehicle includes a traction battery, a cabin, a first compressor associated with cooling one of the traction battery or cabin, a second compressor associated with cooling the other of the traction battery or cabin, and a controller. The controller operates the first and second compressors such that a speed of the second compressor does not exceed a difference between a speed of the first compressor and a predetermined offset speed delta responsive to the speed of the first compressor being greater than a threshold speed.

DETAILED DESCRIPTION

Figure 1:
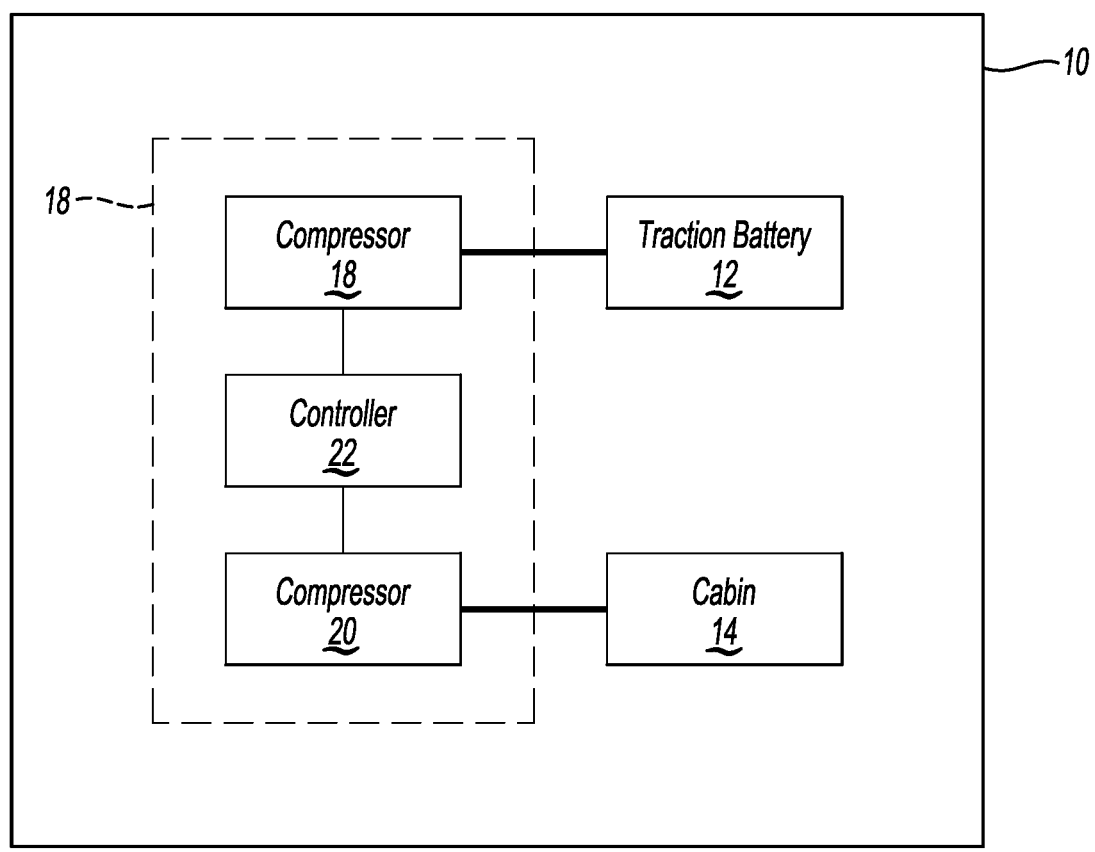
FIG. 1 is a schematic diagram of a vehicle.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated or described with reference to any one example may be combined with features illustrated or described in one or more other examples to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Some vehicles require dual compressor cooling systems to provide better cooling for the high voltage battery and cabin. One compressor is dedicated to cabin air conditioning, and the other is dedicated to battery cooling. A single compressor may not be enough to sustain both functions during high towing capacity in harsh conditions (e.g., steep grade, hot ambient temperatures, etc.). These dual electronic air conditioning systems may, under certain conditions, be susceptible to a beating/heterodyne noise when both compressors are operating at similar speeds. Their frequencies should be separated by a fixed amount regardless of the speed of either compressor, throughout all operating speeds and conditions. If not, a vehicle occupant may hear an associated noise. Dynamic speed separation strategies are thus proposed herein.

In some examples, if both compressors are running, the primary cabin compressor takes priority. The control module's speed separation function will first check if the cabin compressor speed is above or below a calibratable boundary threshold. If the speed is greater than the threshold, a temporary maximum secondary compressor speed is calculated as the primary compressor speed minus the desired separation amount, which can be determined via simulation, testing, etc. If speed is less than the threshold, a temporary minimum secondary compressor speed is calculated as the primary speed plus the desired separation amount. This final minimum secondary compressor speed is the maximum between the calculated temporary minimum and the hardware minimum. The final maximum secondary compressor speed is the minimum between the calculated temporary maximum, the hardware maximum, and the calibrated chiller operation maximum speed. If the compressor's static keep-out zone and speed separation are both active, the static keep-out zone will take priority. As such, the controls will adjust the previously calculated minimum and maximum speeds, as calculated by the speed separation function. This adjustment depends on where within the static keep-out zone the speed lies. The final second compressor speed is arbitrated one last time before commanding the compressor. This final calculation takes the other compressor speed controller outputs into account, e.g., power, pressure, etc., and adjusts accordingly. This results in one speed that includes all controllers, thus operating the compressors.

These strategies provide a way to reduce noise associated with operation of dual-compressor systems. In the examples above, only the battery compressor speed is altered. The cabin compressor speed can alternatively be altered, or both depending on system requirements.

Referring to FIG. 1, a vehicle 10 includes, among other things, a traction battery 12, a cabin 14, and a climate system 16. The traction battery 12 may provide power to an electric machine that is arranged to drive wheels of the vehicle. The traction battery 12 may also receive power from the electric machine during regenerative braking operations. The cabin 14 includes interior elements that can accommodate of the vehicle 10.

The climate system 16 includes compressors 18, 20 and a controller 22. The compressors 18 is arranged to facilitate the supply of cooling fluid to the traction battery 12. The compressor 20 is arranged to facilitate the supply of cooling fluid to the cabin 14. The controller 22 is in communication with and controls the compressors 18, 20 (and the climate system 16 more generally). Depending on cooling requirements of the traction battery 12 and cabin 14, the compressor 18 may be operated while the compressor 20 is off, the compressor 20 may be operated while the compressor 18 is off, and the compressors 18, 20 may be operated at a same time.

Figure 2:
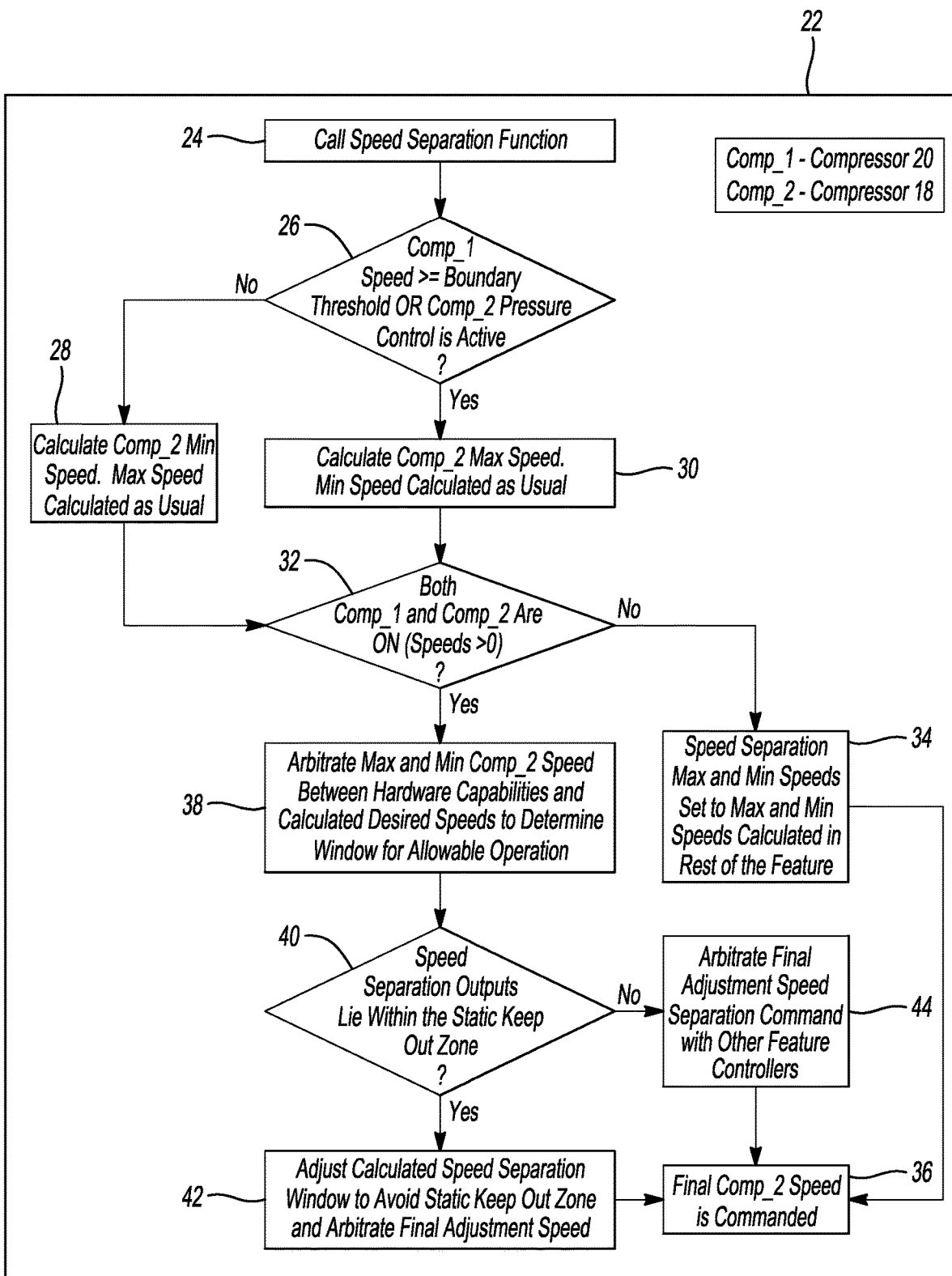
FIG. 2 is a flow chart of an algorithm for control of a dual compressor climate system.

Referring to FIG. 2, the controller 22 calls the speed separation function at operation 24 to establish the speed limits of the compressors 18, 20. At decision block 26, the controller 22 determines whether the speed of the compressor 20 is greater than or equal to a boundary threshold or a pressure control algorithm for the compressor 18 is active. The boundary threshold may be determined via a simulation, testing, etc., and is used to determine whether the minimum or maximum speed of the compressor 18 should change to maintain a target speed separation with the compressor 20.

The speed of a compressor can depend on temperature as well as input and output pressures. Known pressure control algorithms are used to maintain input and output pressures within predefined ranges. If an input or output pressure is near a minimum or maximum limit for the compressor, the pressure control algorithm becomes active.

If no, the controller 22 at operation 28 determines an updated minimum speed for the compressor 18. Assuming the boundary threshold is 3000 rpm, the target speed separation is 600 rpm, and the speed of the compressor 20 is 2500 rpm, the controller 22 would compute the updated minimum speed for the compressor 18 as 2500 rpm plus 600 rpm, or 3100 rpm. Assuming the speed of the compressor 20 is 2400 rpm, the controller 22 would compute the updated minimum speed for the compressor 18 as 3000 rpm. Standard minimum and maximum speeds for the compressor 18 as well as standard minimum and maximum speeds for the compressor 20 are also determined via standard techniques. A look-up table, for example, may define minimum and maximum speeds for the compressors 18, 20 depending on various operating parameters such as temperature, etc.

If yes, the controller 22 at operation 30 determines an updated maximum speed for the compressor 18. Assuming the boundary threshold is 4000 rpm, the target speed separation is 400 rpm, and the speed of the compressor 20 is 4200 rpm, the controller 22 would compute the updated maximum speed for the compressor 18 as 4200 rpm minus 600 rpm, or 3600 rpm. Assuming the speed of the compressor 20 is 4100 rpm, the controller 22 would compute the updated maximum speed for the compressor 18 as 3500 rpm. Standard minimum and maximum speeds for the compressor 18 as well as standard minimum and maximum speeds for the compressor 20 are also determined via standard techniques.

At decision block 32, the controller 22 determines whether the compressors 18, 20 are operating at a same time via standard techniques. The controller 22, for example, may determine whether each of the compressors 18, 20 has a speed that is greater than zero.

If no, the controller 22 at operation 34 determines speed separation is not needed, and the standard minimum and maximum speeds for the one of the compressors 18, 20 that is operating are used.

At operation 36, the controller commands the speed of the one of the compressors 18, 20 that is operating while adhering to the standard minimum and maximum speeds selected at operation 34.

If yes, the controller 28 arbitrates the updated minimum or maximum speed (and corresponding other of the standard minimum or maximum speed) for the compressor 18 against any limits on speed dictated by the hardware of the compressor 18 and the calculated desired speeds for the compressor 18 to determine a window of allow speeds for the compressor 18 at operation 38. Assuming an updated minimum speed for the compressor 18 is 2400 rpm, the standard maximum speed for the compressor 18 is 3400 rpm, and hardware constraints associated with the compressor 18 do not allow the compressor 18 to operate below 2500 rpm, the controller 22 would recalibrate the updated minimum speed for the compressor 18 to 2500 rpm. Assuming an updated maximum speed for the compressor 18 is 4500 rpm, the standard minimum speed for the compressor is 2200 rpm, and hardware constraints associated with the compressor 18 do not allow the compressor 18 to operate above 4400 rpm, the controller 22 would recalibrate the updated maximum speed for the compressor 18 to 4400 rpm.

At decision block 40, the controller 22 determines whether the minimum and maximum speeds overlap with any static keep-out zone. A keep-out zone, as known in the art, is a range of compressor speeds that are not permitted. Assuming the static keep-out zone is defined as the speeds from 2900 rpm to 3200 rpm, and the updated maximum speed for the compressor 18 is 3000 rpm, the controller 22 would determine that an overlap exists between the static keep-out zone and the currently allowed speed range of the compressor 18. Assuming the static keep out zone is defined as the speeds from 2900 rpm to 3200 rpm, and the updated maximum speed for the compressor 18 is 2900 rpm, the controller 22 would determine that an overlap does not exist between the static keep-out zone and the currently allowed speed range of the compressor 18.

If yes, the controller 22 recalibrates the updated minimum or maximum speed of the compressor 18 to stay out of the static keep-out zone and any other speeds that are precluded by the system or other components (if any) at operation 42. Continuing with the overlap example above, the controller 22 would recalibrate the updated maximum speed of the compressor 18 from 3000 rpm to 2900 rpm.

If no, the controller recalibrates the updated minimum or maximum speed of the compressor 18 to prevent operating at any other speeds that are precluded by the system of other components (if any) at operation 44.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. "Controller" and "controllers," for example, may be used interchangeably herein.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive climate system comprising:
   first and second compressors; and
   a controller programmed to,
   while a speed of the first compressor during operation is less than a threshold speed, prevent a speed of the second compressor during operation from falling below a minimum threshold speed that is defined by a sum of the speed of the first compressor and a predefined offset speed delta such that the minimum threshold speed changes as the speed of the first compressor changes, and
   while the speed of the first compressor during operation is greater than the threshold speed, prevent the speed of the second compressor during operation from exceeding a maximum threshold speed that is defined by a difference between the speed of the first compressor and the predefined offset speed delta such that the maximum threshold speed changes as the speed of the first compressor changes.

2. The automotive climate system of claim 1, wherein the controller is further programmed to, while pressure control for the second compressor is active, prevent the speed of the second compressor during operation from exceeding the maximum threshold speed such that the maximum threshold speed changes as the speed of the first compressor changes.

3. The automotive climate system of claim 1, wherein the controller is further programmed to prevent the speed of the first or second compressor during operation from achieving a predefined range of speeds.

4. The automotive climate system of claim 1, wherein the first compressor is associated with cooling of a cabin.

5. The automotive climate system of claim 1, wherein the first compressor is associated with cooling of a traction battery.

6. A method comprising:
   operating first and second compressors of a climate system such that a speed of the second compressor is at least equal to a sum of a speed of the first compressor and a predetermined offset speed delta responsive to the speed of the first compressor being less than a threshold speed.

7. The method of claim 6 further comprising operating the first and second compressors such that the speed of the second compressor is less than a difference between the speed of the first compressor and the predetermined offset speed delta responsive to the speed of the first compressor being greater than the threshold speed.

8. The method of claim 6 further comprising operating the first and second compressors such that the speed of the second compressor is less than a difference between the speed of the first compressor and the predetermined offset speed delta responsive to pressure control for the second compressor being active.

9. The method of claim 6 further comprising operating the first and second compressors to prevent the speed of the first or second compressor from achieving a predefined range of speeds.

10. The method of claim 6, wherein the first compressor is associated with cooling of a cabin.

11. The method of claim 10, wherein the second compressor is associated with cooling of a traction battery.

12. The method of claim 6, wherein the first compressor is associated with cooling of a traction battery.

13. The method of claim 12, wherein the second compressor is associated with cooling of a cabin.

14. A vehicle comprising:
    a traction battery;
    a cabin;
    a first compressor associated with cooling one of the traction battery or cabin;
    a second compressor associated with cooling the other of the traction battery or cabin; and
    a controller programmed to operate the first and second compressors such that a speed of the second compressor does not exceed a difference between a speed of the first compressor and a predetermined offset speed delta responsive to the speed of the first compressor being greater than a threshold speed.

15. The vehicle of claim 14, wherein the controller is further programmed to operate the first and second compressors such that the speed of the second compressor is at least equal to a sum of the speed of the first compressor and the predetermined offset speed delta responsive to the speed of the first compressor being less than the threshold speed.

16. The vehicle of claim 14, wherein the controller is further programmed to operate the first and second compressors such that a speed of the second compressor is less than the difference responsive to pressure control for the second compressor being active.

17. The vehicle of claim 14, wherein the controller is further programmed to operate the first and second compressors to prevent the speeds of the first or second compressor from achieving a predefined ranges of speeds.

18. The vehicle of claim 14, wherein the first compressor is associated with cooling of the cabin.

19. The vehicle of claim 14, wherein the first compressor is associated with cooling of the traction battery.

* * * * *